(12) United States Patent
Maimin et al.

(10) Patent No.: US 8,690,224 B2
(45) Date of Patent: Apr. 8, 2014

(54) PICK-UP TRUCK BOX COVER

(76) Inventors: Israel Maimin, San Fernando, CA (US); Julian Maimin, San Fernando, CA (US)

( * ) Notice: Subject to any disclaimer, the term of this patent is extended or adjusted under 35 U.S.C. 154(b) by 0 days.

(21) Appl. No.: 13/454,843

(22) Filed: Apr. 24, 2012

(65) Prior Publication Data

US 2012/0205939 A1 Aug. 16, 2012

Related U.S. Application Data

(63) Continuation of application No. 13/227,373, filed on Sep. 7, 2011, now Pat. No. 8,182,021, which is a continuation of application No. 12/471,880, filed on May 26, 2009, now Pat. No. 8,061,758, which is a continuation of application No. 11/537,403, filed on Sep. 29, 2006, now Pat. No. 7,537,264.

(51) Int. Cl.
*B60R 9/06* (2006.01)

(52) U.S. Cl.
USPC ............... 296/100.09; 296/37.6; 296/136.06

(58) Field of Classification Search
USPC ............... 296/100.06–100.09, 37.6, 136.04, 296/136.06, 37.1
See application file for complete search history.

(56) References Cited

U.S. PATENT DOCUMENTS

| | | | |
|---|---|---|---|
| 4,210,361 A | 7/1980 | Marvin et al. | |
| 4,216,990 A | 8/1980 | Musgrove et al. | |
| 4,221,423 A | 9/1980 | Stone | |
| 4,313,636 A | 2/1982 | Deeds | |
| 4,518,194 A | 5/1985 | Kirkham et al. | |
| 4,747,441 A | 5/1988 | Apolzer et al. | |
| 4,784,427 A | 11/1988 | Burgess | |
| 4,795,206 A | 1/1989 | Adams | |
| 4,807,921 A | 2/1989 | Champie, III et al. | |
| 4,844,531 A | 7/1989 | Kooiker | |
| 4,861,092 A | 8/1989 | Bogard | |
| 4,889,381 A | 12/1989 | Tamblyn et al. | |
| 4,946,217 A | 8/1990 | Steffens et al. | |
| 5,040,843 A | 8/1991 | Russell et al. | |
| 5,074,188 A | 12/1991 | Harris | |
| 5,087,093 A | 2/1992 | Repetti | |
| 5,350,213 A | 9/1994 | Bernardo | |
| 5,427,428 A | 6/1995 | Ericson et al. | |
| 5,564,773 A | 10/1996 | Lapsley et al. | |
| 5,636,893 A | 6/1997 | Wheatley et al. | |
| 5,795,011 A | 8/1998 | Flentge | |
| D403,292 S | 12/1998 | Bogard | |

(Continued)

OTHER PUBLICATIONS

Bak Industries, RollBak Installation Instructions, Sep. 2003.

(Continued)

*Primary Examiner* — Glenn Dayoan
*Assistant Examiner* — Melissa A Black
(74) *Attorney, Agent, or Firm* — Kenneth H. Ohriner; Perkins Coie LLP

(57) ABSTRACT

A cover assembly for a pick-up truck cargo box includes first and second rails attachable at the sides of the box. A cover has a first resilient hinge strip connecting a first panel to a second panel and allowing the first panel to pivot relative to the second panel. A third panel is attached to the second panel by a second resilient hinge strip, which allows the second panel to pivot relative to the third panel. The panels are supported on the rails. Latches on the panels hold the panels onto the rails. The cover may be opened by sequentially releasing the latches and folding the panels over onto each other.

10 Claims, 13 Drawing Sheets

(56) References Cited

U.S. PATENT DOCUMENTS

| | | |
|---|---|---|
| 5,857,729 A | 1/1999 | Bogard |
| 6,024,402 A | 2/2000 | Wheatley |
| 6,076,881 A | 6/2000 | Tucker |
| 6,082,806 A | 7/2000 | Bogard |
| 6,113,176 A | 9/2000 | Bernardo |
| 6,126,225 A | 10/2000 | Griffin |
| 6,126,226 A | 10/2000 | Wheatley |
| 6,217,102 B1 | 4/2001 | Lathers |
| 6,234,559 B1 * | 5/2001 | Block et al. ............... 296/100.06 |
| 6,340,194 B1 | 1/2002 | Muirhead et al. |
| 6,352,296 B1 | 3/2002 | Kooiker |
| 6,422,635 B1 | 7/2002 | Steffens et al. |
| 6,454,337 B2 | 9/2002 | Steffens et al. |
| 6,520,559 B1 | 2/2003 | Steffens et al. |
| 6,527,330 B1 | 3/2003 | Steffens et al. |
| 6,565,141 B1 | 5/2003 | Steffens et al. |
| 6,702,359 B2 | 3/2004 | Armstrong et al. |
| 6,752,449 B1 | 6/2004 | Wheatley |
| 6,827,389 B1 | 12/2004 | Pandorf |
| 6,899,372 B1 | 5/2005 | Keller |
| 7,021,693 B2 | 4/2006 | Keller |
| 7,066,523 B2 | 6/2006 | Verduci et al. |
| 7,445,264 B2 | 11/2008 | Spencer et al. |
| 7,537,264 B2 | 5/2009 | Maimin |
| 7,828,361 B1 | 11/2010 | Spencer |
| 8,061,758 B2 | 11/2011 | Maimin et al. |
| 8,182,021 B2 | 5/2012 | Maimin et al. |
| 2003/0197394 A1 | 10/2003 | Dimmer |
| 2003/0230909 A1 | 12/2003 | Melius et al. |
| 2004/0245799 A1 | 12/2004 | Rusu |

OTHER PUBLICATIONS

Hard Lid Tonneau, Extang, Solid Fold, http://extang.com/docs/solidfold.html.

"Extang Corporation and Undercover Inc.'s Preliminary Invalidity Contentions Re U.S. Patent Nos. 7,537,264; 8,061,758; and 8,182,021", filed on Feb. 8, 2013 in the U.S. District Court, Western District of Wisconsin, in the case of *Extang Corporation et al.* v. *Laurmark Enterprises, Inc.*, Case No. 12-cv-372.

RollBak install instructions (Jan. 2005).

* cited by examiner

PICK-UP TRUCK BOX COVER

This application is a Continuation of U.S. patent Application No. 13/227,373 filed Sep. 7, 2011, now U.S. Pat. No. 8,182,021 B2, which is a Continuation of U.S. patent application Ser. No. 12/471,880, filed May 26, 2009, now U.S. Pat. No. 8,061,758, which is a Continuation of U.S. patent application Ser. No. 11/537,403, filed Sep. 29, 2006, now U.S. Pat. No. 7,537,264, and incorporated herein by reference.

BACKGROUND

Pick-up trucks are one of the most popular and versatile vehicles in use today. Pick-up trucks typically have an enclosed cab and an open cargo box in the rear of the truck. The open cargo box allows all types of things to be quickly and easily loaded, carried and unloaded. Despite this versatility, the open cargo box has multiple significant disadvantages. First, with the box tailgate closed, the box creates significant air turbulence and drag on the truck, especially at high speeds. This reduces the fuel efficiency of the vehicle and may also add to the noise level within the cab. Another disadvantage is the complete lack of security. Anything in an open box can be quickly and easily stolen. The open cargo box also leaves the contents of the box exposed to the weather.

Various types of box covers have been proposed to overcome these problems. In a primitive form, a box cover may simply be a piece of canvas or vinyl fitted over the top of the box and tied down to the truck. More sophisticated covers made of metal, fiberglass, and plastic have also been used. Still, various disadvantages remain. Many covers leak, allowing rain to enter the box where it can damage the contents of the box, or increase corrosion of the box itself. Other covers may be time consuming and difficult to install. Some covers tend to permanently fully or partially close off areas of the cargo box, or make it very difficult to reach into a front or rear end of the box. Accordingly, an improved pick-up truck cargo box cover is needed.

SUMMARY

An improved pick-up truck cargo box cover has now been invented solving multiple problems associated with existing covers. This new cargo box cover is easy to install. It is also highly resistant to water penetration, so that the contents of the box stay dry when covered. This new cover also provides a secure barrier to protect the contents of the box from theft, vandalism, or from falling out of the box during a rough ride. The present cover is also lightweight, yet also durable, strong and rigid. Accordingly, it is able to reduce drag and improve fuel economy.

In one aspect, a cover assembly for a pick-up truck cargo box includes first and second side rails which attach to the sides and/or top of the cargo box. A foldable cover is attachable to the first and second rails. The cover may include a first hinge strip connecting a first panel to a second panel and allowing the first panel to pivot or fold relative to the second panel. Typically, a third panel is also included and is similarly attached to the second panel by a second hinge strip allowing the second panel to pivot relative to the third panel. A releasable latch system may be used to hold one or more of the panels onto the rails. The cover may accordingly be quickly and secured deployed on or over the box, and also partially or fully folded up to allow access to any section of the cargo box. Other elements and advantages will become apparent from the following detailed description. A single embodiment is shown and described as one example of how the invention may be made and used, with various other examples also being possible. The invention resides as well in subcombinations of the elements described.

BRIEF DESCRIPTION OF THE DRAWINGS

In the drawings, wherein the same reference number indicates the same element in each of the views.

DETAILED DESCRIPTION OF THE DRAWINGS

Figure 1:
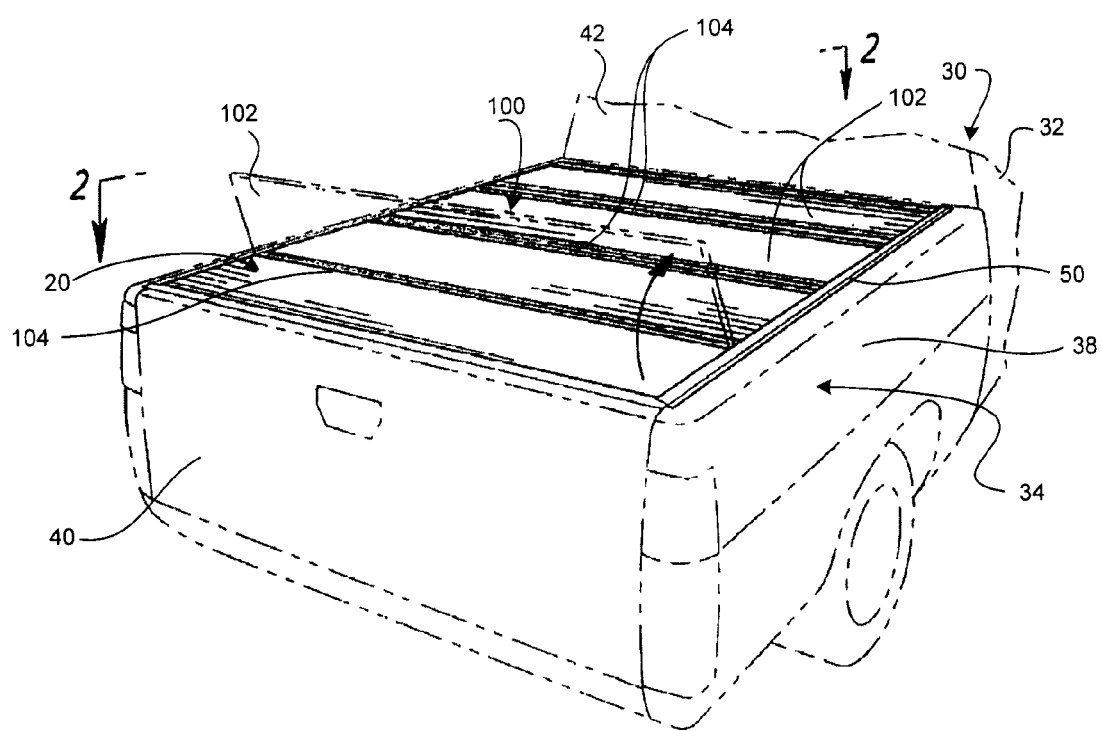
FIG. 1 is a perspective view of the novel cover installed on a pick-up truck.

Turning now in detail to the drawings, a novel cover assembly generally designated as 20 is installed on a cargo box 34 of a pick-up truck 30. The cargo box 34 is typically rectangular, and is formed between left and right box side walls 38, a tail gate 40 at the back of the truck 30, and a front or cab wall 42 at the front of the box 34, adjacent to the cab 32 of the truck 30. The cargo box 34 generally also has a floor 36, shown in FIG. 2, which may be continuous with the box side walls 38 and/or the cab wall 42.

Figure 4:
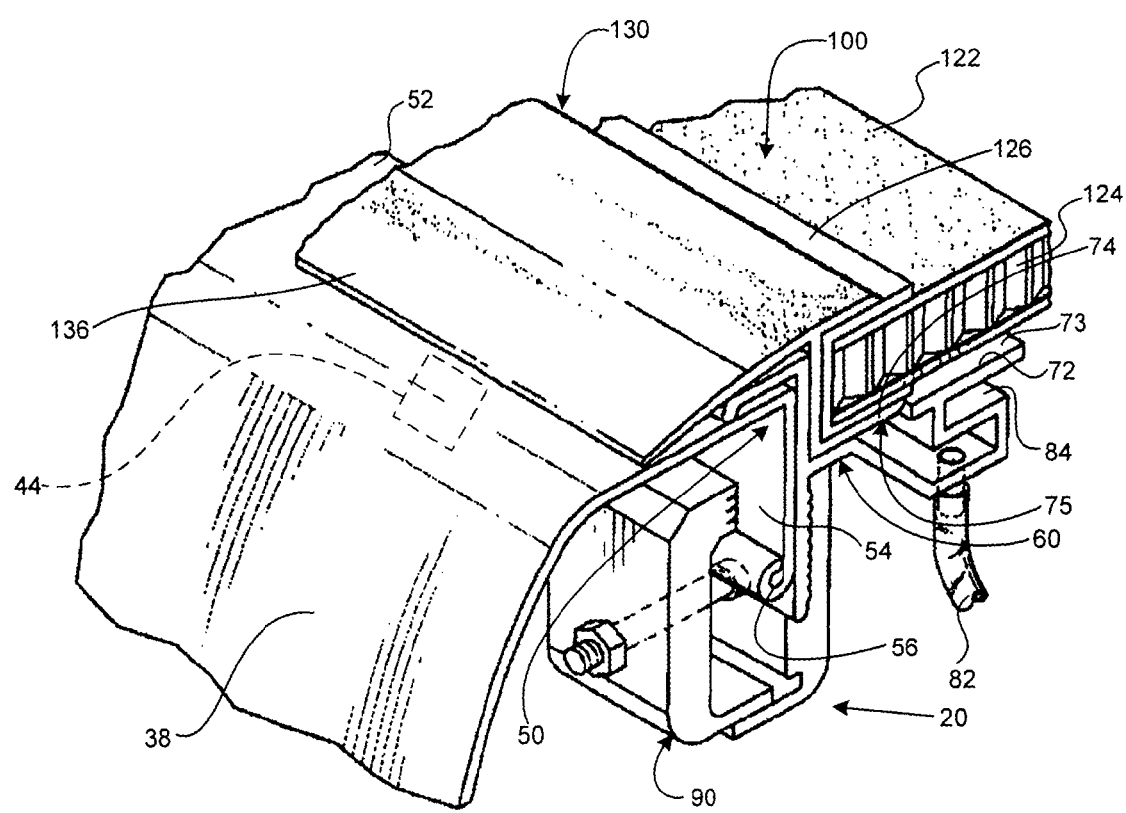
FIG. 4 is a perspective section view showing an example of an installation of the cover assembly shown in FIGS. 1-3.
Figure 5:
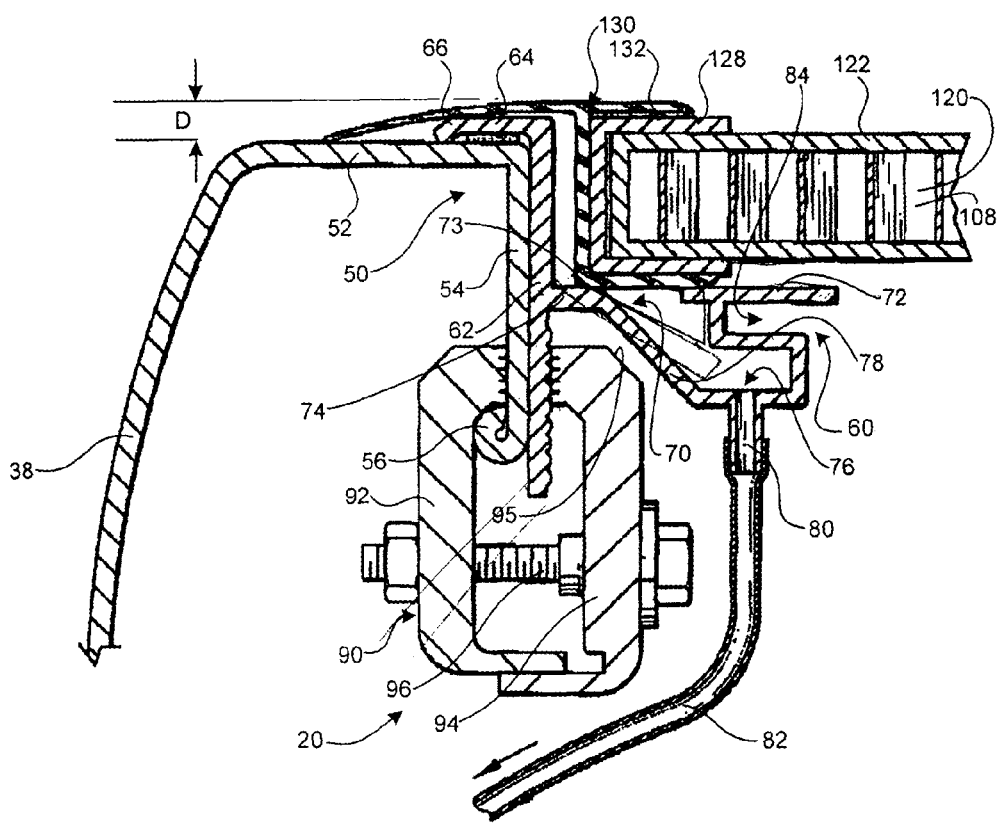
FIG. 5 is a section view taken along line 5-5 of FIG. 2.

As shown in FIG. 4, the cargo box 34 typically has left and right box rails 50, with a generally flat and horizontal top section 52 and a generally flat vertical side section 54 forming the box rail 50. The lower edge of the side section 54 may have a rolled in end 56. Stake pockets or openings 44 may be provided on some cargo boxes 34 through the top section 56 of the box rail 50, adjacent to where the top section 52 joins into the box side wall 38. FIGS. 4 and 5 show a cargo box 34 for a typical pick-up truck 30. Of course, the cover assembly 20 may also be used with various other types of cargo boxes, FIGS. 4 and 5 showing one example.

Figure 3:
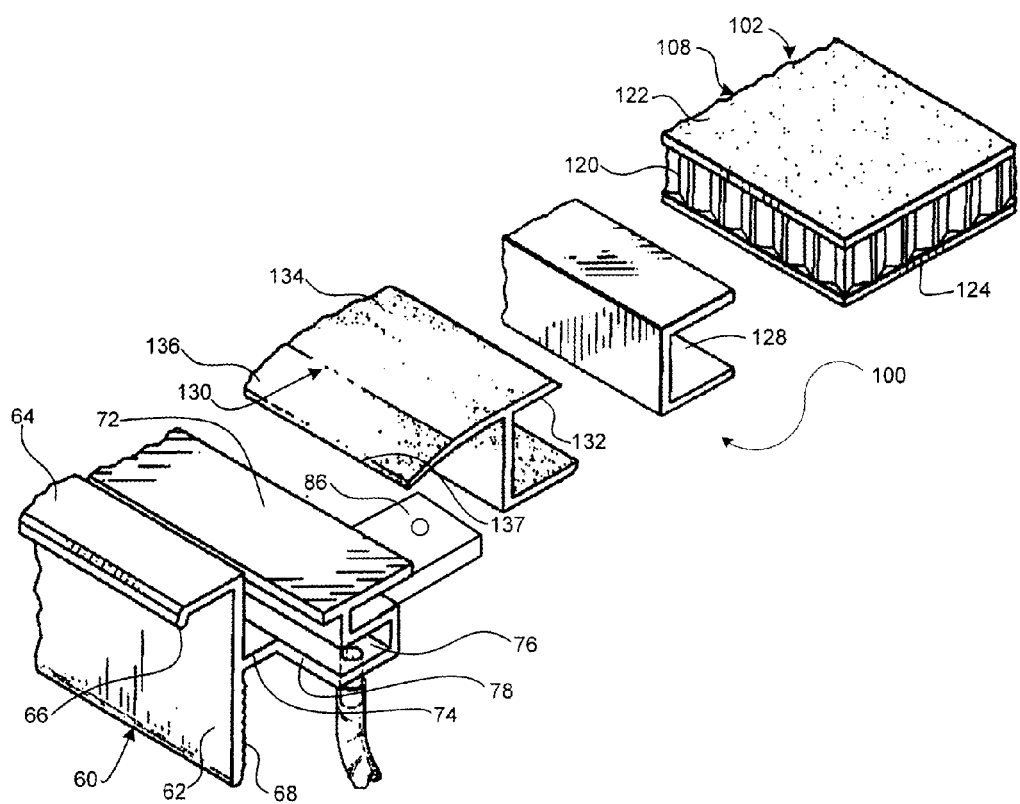
FIG. 3 is an exploded perspective view of components of the cover assembly shown in FIGS. 1 and 2.

Referring now to FIGS. 3, 4, and 5, the cover assembly 20 includes a cover generally indicated as 100, and left and right side rails 60. The cover assembly 20 may be provided as a kit including the cover 100, the left and right side rails 60, along with clamps 90, and optionally also including shims. The cover 100 may also be used separately from the side rails 60 and clamps 90, in other applications.

FIGS. 3-5 show the right side rail 60 installed to the inside of the right side of the cargo box 34. The left side rail and other components shown in FIGS. 3-5, on the left side of the cargo box are mirror images of the right side. As shown in FIGS. 3, 4, and 5, the side rail 60 has a clamp plate 62 which is typically substantially vertical when the side rail 60 is installed on a cargo box 34, as shown in FIGS. 4 and 5. A lip plate 64 extends outwardly, generally at a right angle, from the clamp plate 62. A lip 66 may be provided on the lip plate 64, with the lip 66 resting on the top section 52 of the box rail 50, leaving the lip plate 64 spaced apart slightly from the box rail top section 52. A lower end of the clamp plate 62 may have a grooved or roughened surface 68, so that the side rail 60 can be more securely held in place by the clamps 90.

Referring to FIG. 5, a cover support section 70 of the side rail 60 extends inwardly from the clamp plate 62. The cover support section 70, in the specific design shown, may have an outer support surface 74 spaced apart from an inner support surface 72 by a drain opening 75, shown in FIG. 4. The cover support section 70 may have a ramp surface 78 extending downwardly at an angle from the drain opening 75 to a drain channel 76, as shown in FIG. 5. A drain outlet 80 and a drain tube 82 may be provided adjacent to a front or rear end of the side rail 60. Generally, the drain outlet 80 and drain tube 82 are provided adjacent to the front end of the side rail 60, since most cargo boxes 34 tend to be lower at the front and higher at the back. The cover support section 70 of the side rail 60 may also have a latch channel 84, as shown in FIG. 5. Referring momentarily to FIG. 3, each side rail 60 may have an extension plate 86 at the front end of the side rail.

Referring once again to FIGS. 4 and 5, on each side of the cargo box 34, the side rail 60 is attached to the box rail 50. The side rail 60 may be attached in various different ways including clamping, bolting, riveting, adhering, welding, mechanical fittings, etc. In the design shown, the side rail 60 is clamped to the side section 54 of the box rail 50 via clamps 90. The claim 90 shown in FIG. 5 has an outer jaw 92 and an inner jaw 94 connected by a clamp bolt 96. Tightening the clamp bolt 96 brings the jaws 92 and 94 together, securing the clamp plate 62 of the side rail 60 to the side section 54 of the box rail 50. One or more clamps 90 may be used on each side. In the design shown, typically three clamps 90 are used on each side of the cargo box 34. The rail may be designed to conform with the clamp shape in order to eliminate any sagging of the rails.

Figure 2:
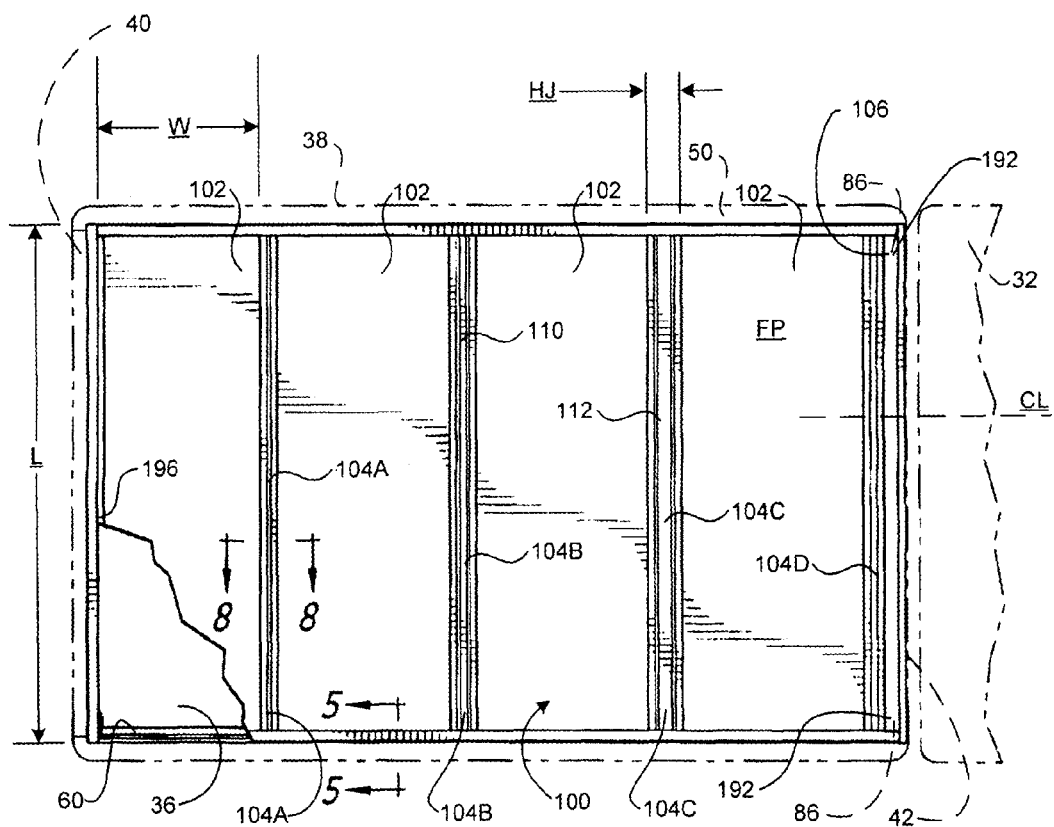
FIG. 2 is a plan view of the cover and pick-up truck box shown in FIG. 1.
Figure 8:
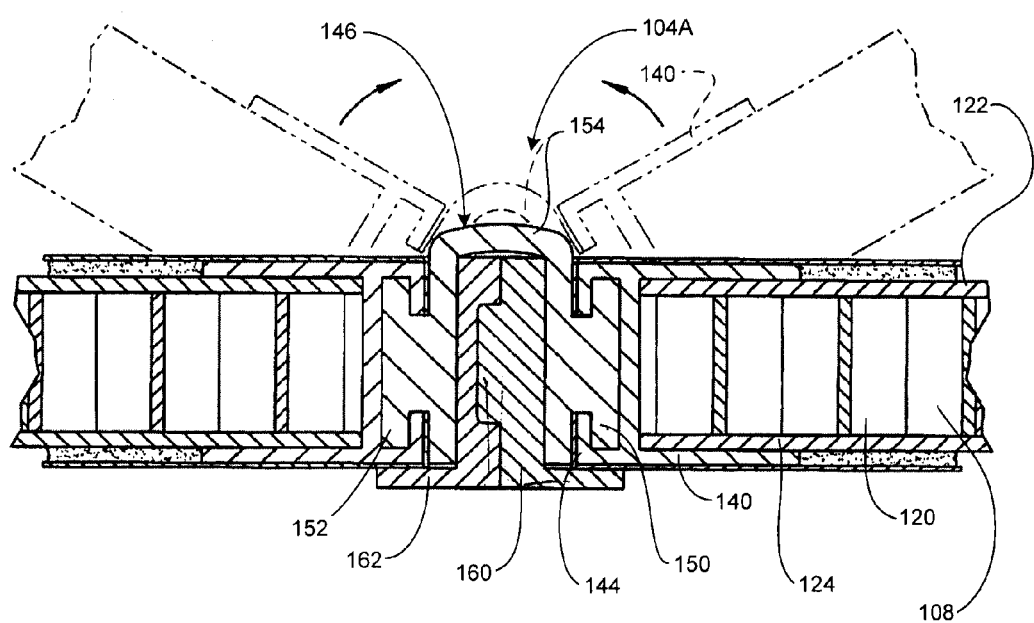
FIG. 8 is a section view taken along line 8-8 of FIG. 2.
Figure 9:
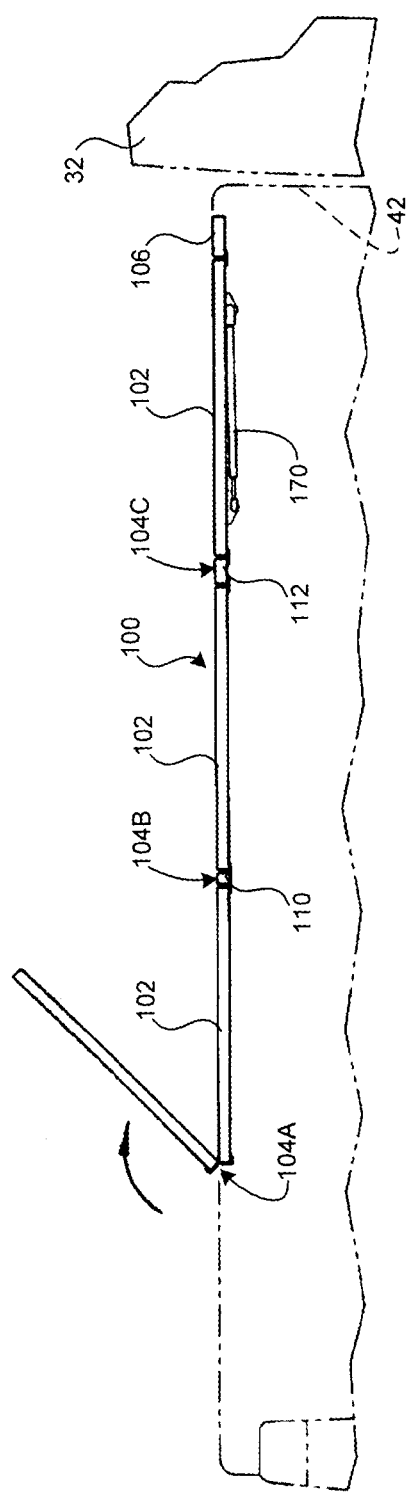
FIG. 9 is a side view of the cover assembly shown in FIGS. 1 and 2, with the first panel folding over onto the second panel of the cover.
Figure 10:
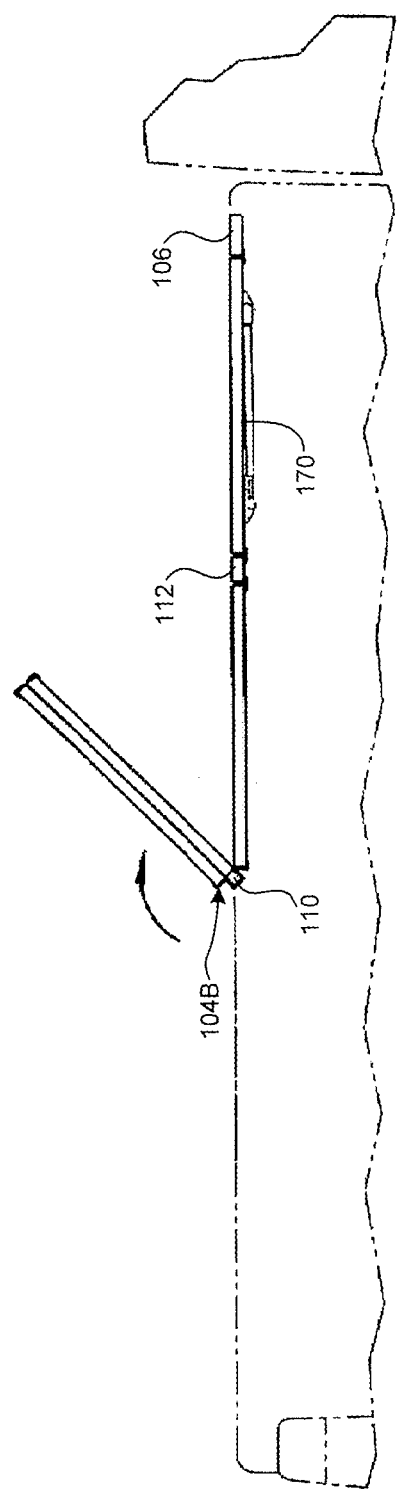
FIG. 10 is a side view similar to FIG. 9 and showing the first and second panels folding over onto the third panel of the cover.
Figure 11:
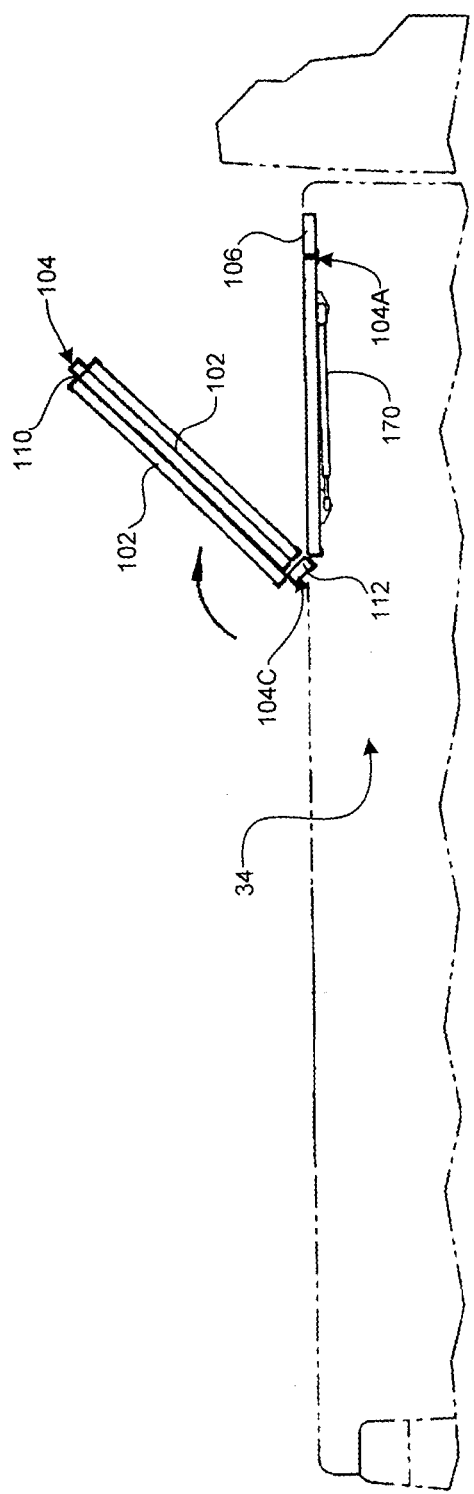
FIG. 11 is a similar side view showing the first, second, and third panels folding over onto a fourth panel of the cover.

Turning now to FIGS. 2 and 9-11, the cover 100 includes two, three, four, five, or more sections or panels 102 connected by hinge joints 104. The hinge joints 104 allow the panels 102 to fold onto each other, to open the cover 100, as shown in FIGS. 9-11. In FIG. 2, first, second, third and fourth hinge joints 104A, 104B, 104C and 104D are shown. The first and fourth hinge joints 104A and 104D may have the same design, for example as shown in FIG. 8. The second and third hinge joints 104B and 104C are similar but include a spacer bar 110 and 112, respectively, as shown in FIGS. 2 and 9-13. The spacer bars 110 and 112 are dimensioned to allow the panels to fold flat onto each other, without stressing the hinge joints, as specifically shown in FIG. 13. When the cover is closed, the spacer bars 110 and 112 may also help to strengthen the cover. The panels 102 are typically rectangular, although square panels may also be used. While the cover 100 is especially useful for covering a cargo box 34 of a pick-up truck 30, it may also be used in other ways. Accordingly, the panels 102 may also have other shapes, besides rectangular or square. The joints 104 may optionally be made without any screws or other fasteners requiring through holes.

Figure 12:
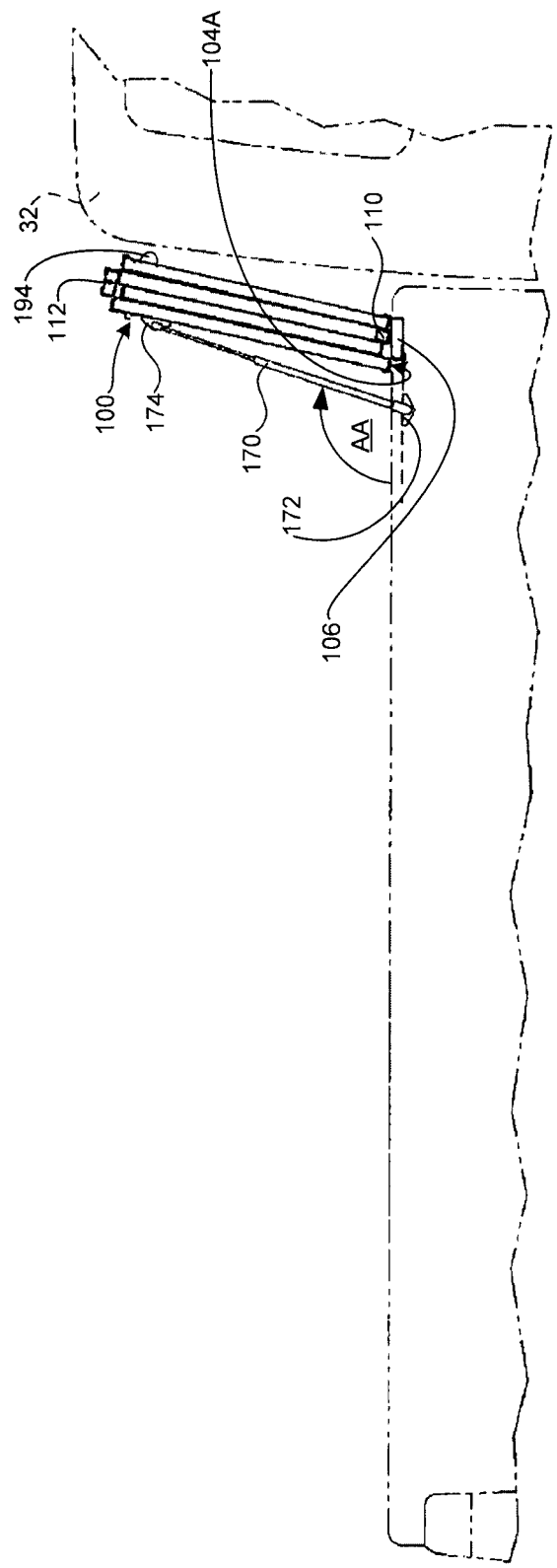
FIG. 12 is a similar side view showing the cover fully folded or open.

The panels 102 shown in FIGS. 2 and 9-11 have a width W to length L ratio of about 1:3, although other ratios ranging from 1:1 to about 1:4, 5, 6, or 8 may also be used. The hinge joints 104 are typically much narrower than the panels 102, with the ratio of the width HJ of the hinge joint 104 to the width W of a panel 102 typically about 1:6 and normally ranging from about 1:4 to 1:8, 10 or higher. The panel 102 closest to the front of the cargo box 34, labeled FP in FIG. 2, may be attached to a relatively narrow cab panel 106, with the cab panel 106 attached to the extension plates 86. Referring momentarily to FIG. 12, the narrow cab panel 106 allows the cover 100 to be folded virtually entirely off of the cargo box 34, so that virtually all areas of the cargo box 34 are easily accessible when the cover 100 is opened.

The panels 102 may be provided as solid or hollow plates or slabs of various materials or they may be composite structures. In the design shown in FIGS. 3-5, a panel 102 has a core section 108 with a side channel 128 attached to the left and right sides of the core. A side cover strip 130 is attached to the side channel 128. Alternatively, if no side channel 128 is used, the side cover strip 130 may be attached directly to the core 108. The side cover strip 130 may be provided as a strip of a resilient material, such as rubber, having a top section 134, and a first tapered flap 136, and a second tapered flap 137 as shown in FIG. 3. The second tapered flap 137 seals down onto the top of the rail of the truck bed, to help seal out water. A rubber strip 73 is attached to the rail 72 to prevent metal to metal contact between the panels and rails.

Referring still to FIG. 3, the core 108 may optionally be formed as a composite structure, for example, a honeycomb core 120 sandwiched between a top sheet or plate 122 and a bottom sheet or plate 124 both adhered or otherwise attached to the honeycomb or other material 120. The top and bottom plates 122 and 124 may be a plastic material, such as ABS. This composite design provides a lightweight yet strong and rigid structure. The side channel 128, if used, may be a simple metal channel section adhered to the core 108. The side cover strip 130 may be attached to the side channel 128 or the core 108 using adhesives or a double-sided tape. The side cover strip 130 may be provided as a continuous single strip attached to each of the panels 102, with the side cover strip 130 sufficiently flexible so that it can fold back over on itself as the panels 102 are folded to open the cover 100, as shown in FIGS. 9-11. Alternatively, the side cover strip 130 may be provided as individual segments separately attached to each panel 102, with a gap between the segments on adjacent panels. Double sided tape 132 may be used to secure the strip 130 to the channel 128, as shown in FIG. 5.

Figure 6:
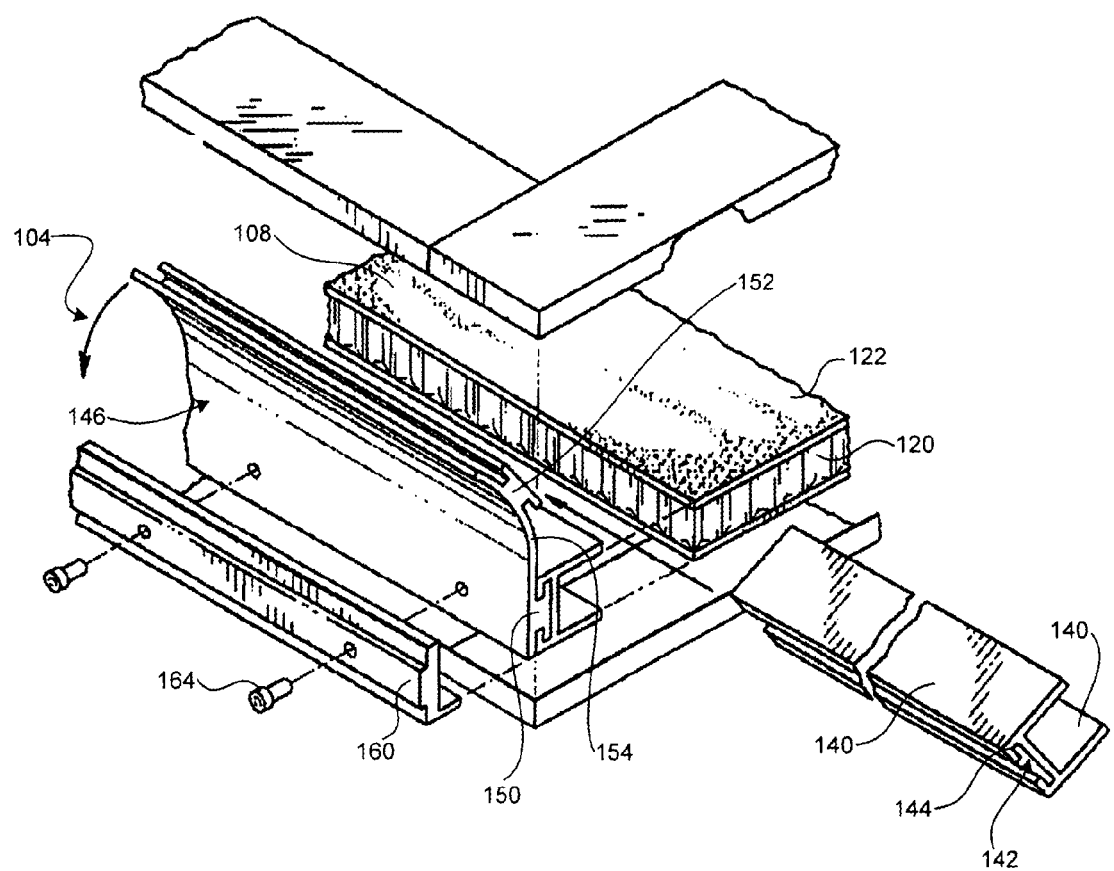
FIG. 6 is an exploded perspective view of a panel of the cover shown in FIGS. 1-5.
Figure 7:
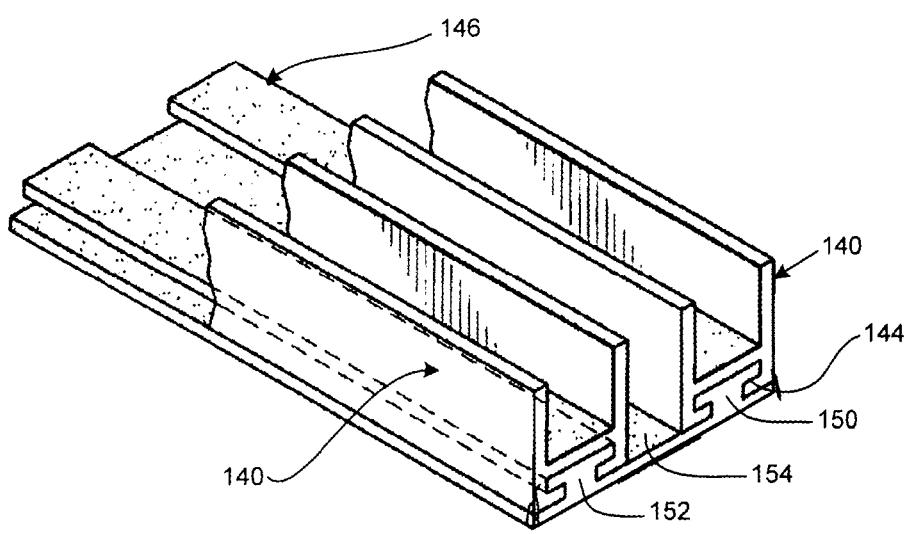
FIG. 7 is a perspective view of the core end frames and hinge strip shown in FIG. 6.

Turning now to FIG. 6, adjacent panels 102 are connected to each other by the hinge joints 104 which include a hinge strip 146, typically made of rubber or other resilient or flexible material. The hinge strip 146 may be attached to adjacent panels 102 in various different ways. In the example shown in FIG. 6, the hinge strip 146 has first and second fittings or attachment features 150 and 152, in this case formed as T-sections. The core 108 of adjacent panels 102 have corresponding features or arms 144 for attaching with the fittings 150 and 152 on the hinge strip 146. The features or arms 144 may optionally be provided on a front/rear or lateral frame 140 attached to a front or rear edge of the core 108 of adjacent panels 102. In the example shown in FIG. 6, the lateral frame 140 may be provided as a metal extrusion having a slot 142 between the arms 144, with the slot 142 dimensioned to slide over and interlock with the fittings 152 and 154 on the hinge strip 146. The fittings 150 and 152 may be spaced apart by a flat or web section 154 of the hinge strip 146, as shown in FIGS. 6-8. As shown in FIG. 8, the backing bars may be dimensioned so that with the joint 104 in the closed (unfolded) position shown in solid lines in FIG. 8, the rubber or other elastomeric material of the hinge strip is optionally slightly compressed. This compression can help to seal the joint 104.

Referring to FIGS. 6 and 8, first and second hinge joint backing bars 160 and 162 may be used to stiffen and strengthen the hinge joints 104. The first backing bar 160 may be attached to the core 108 or lateral frame 140 using fasteners 164. The backing bars 160 and 162 may be interlocking with each other, i.e., having features that engage each other. Alternatively, the backing bar 160 or 162 may be bonded or adhered to a bottom surface of the hinge strip 146. In many applications, the backing bars 160 and 162 may be entirely omitted.

As shown in FIG. 12, a compression spring element, such as an air cylinder 170, is attached to the back end of the front panel FP. Typically, the lower end of the spring 170 may be attached to a fitting 172 adjacent a front end of the side rail 60, with the upper end of the spring 170 attached to a mounting plate 174 on a bottom surface of the front panel FP. The spring element 170 holds the folded cover 100 in an over center position, as shown in FIG. 12.

Figure 13:
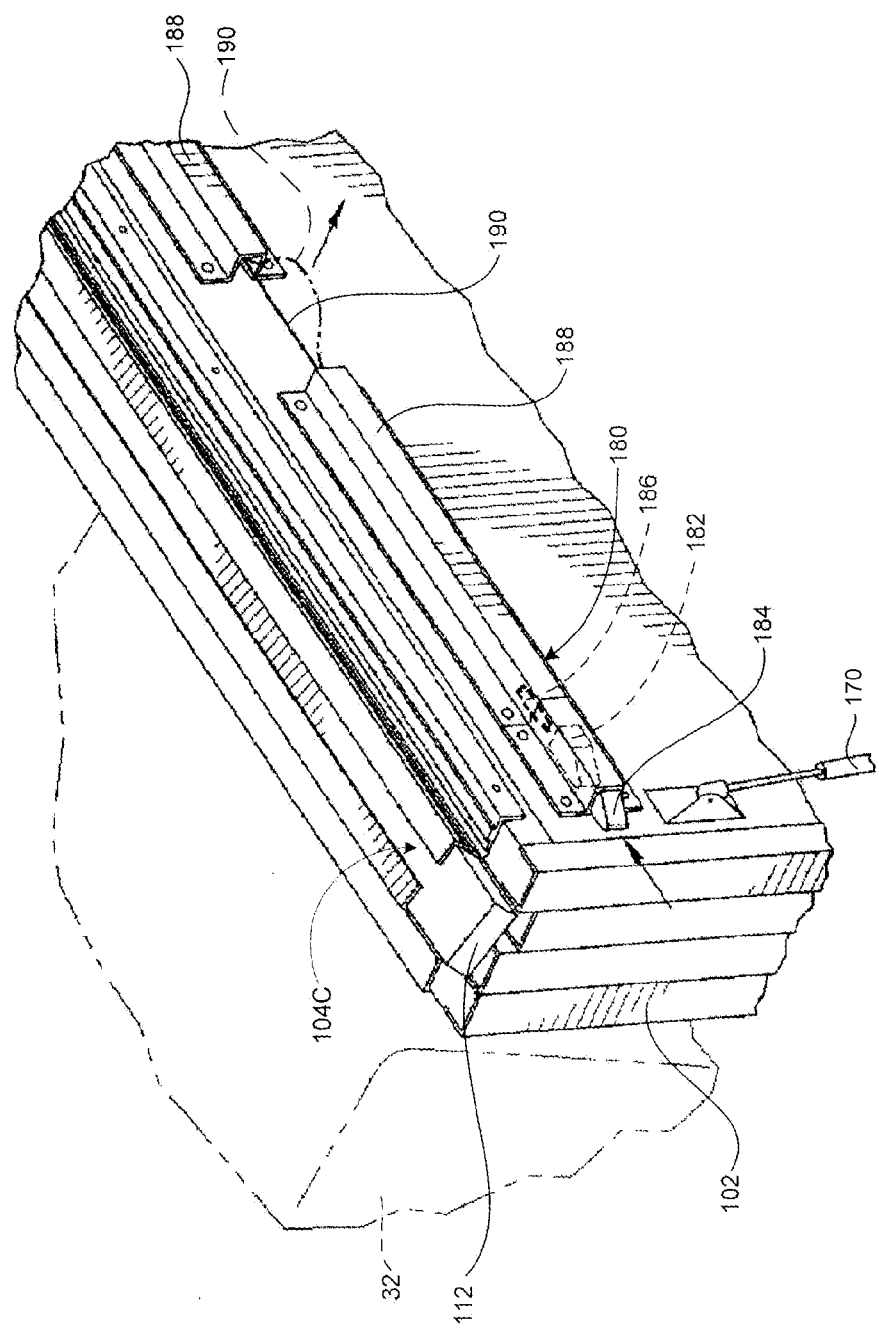
FIG. 13 is a perspective view of the cover as shown in FIG. 12.

Referring to FIG. 13, a slam latch assembly 180 is generally provided along the back edge of each panel 102. The slam latch assembly 180 is used to hold or lock the panels 102 down in a closed position as shown in FIG. 2. Various forms of latch assembly 180 may be used. In the example shown in FIG. 12, the latch assembly 180 has a latch or plunger 182 held within a latch housing 188 and pushed outwardly into the latch channel 84, shown in FIG. 4, by a spring element 186. The latch 182 may optionally have an angled lower surface 184, to better guide the latch 182 into the latch channel 84, or other recess. A release mechanism, such as a cable, chain, bar, linkage, etc. 190, is connected to the slam latches 182 to release them, in this case by pulling on the cable 190, to allow a panel 102 to be opened. As shown in FIG. 13, the release mechanism 190 may be accessible at a central location, or at locations along both sides of the cover 100. This allows the panels to be released from either side of the truck.

In general, the cover assembly 20 is symmetrical about its center line CL shown in FIG. 2. Accordingly, the description of components or elements described above applies to both the left and right sides of the cover assembly 20.

The cover 100 and side rails 60 may be manufactured to fit the specific dimensions of a cargo box 34 of a specific pick-up truck 30. For most cargo boxes 34, the cover 100 has four panels 102, as shown in FIG. 2. However, for shorter cargo boxes 34, three panels or more 102 may be used, while a cover 100 for use on a longer cargo box 34 may have four or more panels 102. Of course, the width W of the panels 102 may be varied, and the number of panels 102 used may also be varied, to meet specific needs.

The cover 100 and the side rail 60 may be provided in a kit made for a specific cargo box 34 of a specific pick-up truck 30. The clamps 90 and shims may also be included in the kit. Referring to FIG. 5, in some cargo boxes 34, the box rail side section 54 may not be vertical, or it may recesses tending to interfere with the clamps. In this case, shims may be used between the side section 54 and the clamp plate 62 of the side rail 60, so that the side rails 60 are properly positioned. In the example shown in FIG. 5, the box rail side section 54 is vertical, so that no shims are needed. To install the cover assembly 20, shims, if any are needed, are placed on the box rail side section 54. The side rail 60 is then placed onto the box rail 50, on each side of the cargo box 34. The front end of each side rail 60 is positioned all the way forward on the cargo box 34, with the front end of the side rail 60 in contact with, or closely adjacent to, the cab wall 42 or front end of the cargo box 34. The clamps 90 are then installed to securely attach each side rail 60 to the box rails 50 of the cargo box 34. The cover 100 is then placed onto the side rails 60, with the cover 100 all the way forward on the cargo box 34.

The cab panel 106, if used, is closely adjacent to, or in contact with, the cab wall 42 or front end of the cargo box 34. The cover 100 is then unfolded, as shown in FIG. 2, to confirm that the cover 100 properly fits onto the side rails 60 and the cargo box 34. Holes are drilled through the cab panel 106 and through the extension plates 86. The cab panel 106 is then attached to the extension plates 86 using mounting bolts 192, and using spacers and washers. The drain tube 82 is routed through an opening in the cab wall 42, or an opening is made in the cab wall or floor for the drain tube. The front end of the side rail 60 is typically closed off with a cap, so that water collecting in the side rail runs out via the drain tube 82. Some trucks have existing drainage holes which can be used.

Referring to FIG. 1, with the cover assembly 20 installed and the tail gate 40 up, the cargo box 34 is entirely covered. The latch assemblies 180 secure the panels 102 to the latch channels 84 of the side rails 60. As a result, the cover 100 cannot be opened or removed without opening the tail gate 40. Consequently, by closing the cover 100 and locking the tail gate 40, the cargo box 34 is secured.

The cover 100 may be opened by opening the tail gate 40. This allows access to the release cable 190. Openings in the latch housing 188, to provide access to the release cable 190, are provided on both sides of the cover 100. Accordingly, the panels 102 may be released by pulling on the release cable 190 from either side of the cargo box 34. Pulling the release cable 190 withdraws the latch 182 from the latch channel 84 of each side rail 60. The panel 102 can then be flipped or folded up, as shown in dotted line in FIG. 1, and as shown in FIGS. 9-12. The first panel is pivoted or folded over onto the second panel, as shown in FIG. 9. The release cable 190 of the second panel is then pulled to release the latches 182 of the second panel. This allows the second panel, along with the first panel, to be folded over onto the third panel, as shown in FIG. 10, and with the same sequence used to release and fold the third panel onto the fourth panel, as shown in FIG. 11. All of the folded panels may then be folded into a substantially upright position, as shown in FIG. 12, to fully open the cover 100. A rubber bumper 194 may be provided on a bottom surface of the second panel 102, to provide a soft contact with the cab 32 when the cover 100 is fully opened, as shown in FIG. 12. The cover 100 is closed using a reverse sequence of steps. The back end of each panel 102 is dropped down, causing the latches 182 to momentarily slide inwardly as the angled surface 184 of the latch 182 passes over the inner support surface 72.

Referring to FIGS. 1, 4, and 5, the sides of the panels 102 may be supported by both the outer support surface 74 and the inner support surface 72 of the side rails 60. These surfaces may be located so that the cover 100 sits approximately flush with the box rail top surface 52, as shown in FIG. 5. The lip plate 64 of the side rail 60 necessarily projects slightly above the box rail top surface. The flap 136 of the side cover strip 130 may extend outwardly entirely over the lip plate 64 and down onto the box rail top section 52. This provides a streamlined design, helps to prevent water from leaking into the cargo box 34 and also provides an aesthetic appearance. Referring to FIG. 5, the top surface or top plate 122 of the core 108 is approximately at the same level as the box rail top section 52. The highest location on the entire cover assembly 20, i.e., the top section 134 of the side cover strip 130 may be positioned above the surface 52 by dimension D, which may be only a few millimeters.

Rainwater may penetrate under the side cover strip 130, or through other locations. Water which enters the space between the side rail 60 and the cover 100 will tend to run down and collect in the drain channel 76, as shown in FIG. 5. Water in the drain channel 76, in most cases, will run forward and drain out through the drain outlet and drain tube 82, due to the slight front to back inclination of the cargo box 34.

Referring to FIGS. 2 and 8, rainwater cannot pass through the liquid impenetrable core 108. Rainwater also cannot penetrate through the hinge joints 104, as the hinge strip 146 forms a water resistant barrier with the adjoining panels 102. Accordingly, when the cover 100 is closed, as shown in FIGS. 1 and 2, the contents of the cargo box 34 are secure and protected from rain. Referring to FIG. 4, the cover 100 does not interfere with use of stake pockets 44, since the stake pockets 44 are positioned to be outside of the side cover strips 130. Since the cover 100 is supported by, and interacts only with the side rails 60, the condition of the box rails 50 and dimensional precision of the box rails 50 of the cargo box 34 have little or no effect on operation of the cover 100.

The cover assembly 20 provides a secure and weather-resistant cover, which is also light-weight. The cover assembly 20 as shown in the drawings weighs only about 40 pounds. Since the cover 100 is rigid when closed, it can also be used as a working or limited supporting surface. Noise and air turbulence associated with an open cargo box are eliminated, and vehicle fuel economy is improved by reducing drag. The cover 100 may be used separately from the side rails, in applications unrelated to a pick-up truck, such as for a canopy cover, or as a cover for a storage box, enclosure, freezer, etc.

As shown in FIGS. 4 and 5, the cover 100 may be generally flush mounted with the top of the box rail 52. The side rails 60 may be self aligning with the truck box 34. With the cover 100 supported only on the side rails 60, (and in this case not on the box itself) the entire cover assembly 20 may also be entirely self aligning. This avoids any need for time consuming or difficult aligning steps during installation. If the box 34 is tapered from end to end, the cover 100 may be similarly tapered. As shown in FIG. 4, the side rails 60 and the flap 136 extend only slightly over the box side walls 38, e.g., ¼ or ½ inch in this specific design. This leaves the stake pockets 44 open and available for use when the cover is installed on the truck 30. The downward curvature of the flap 36, as shown in FIGS. 4 and 5, helps to seal the cover 100 to the box 34, to better keep wind and rain out. The core 120 while shown as a honeycomb material may optionally be made as solid slab or block.

Referring to FIG. 5, the clamp jaw 94 may have a surface 95 parallel to the ramp surface 78 of the side rail 60. As a result, the surface 95 can act as a hard stop for the cover support section 70. As shown in FIG. 12, the cover 100 may open up to an angle AA, which can be greater than 90 degrees. This provides complete access to the box 34 when the cover is open. Cargo may be loaded to a position higher than the roof of the cab, without removing the cover 100. As also shown in FIG. 12, when open, the folded cover takes up very little length, for example 3%, or even less of the box space. Referring to FIG. 2, a rigid lip 196 may be provided along the back end of the first section 102, with the lip 196 resting on top of the tailgate 40 and cab wall. The lip 196 will prevent any sagging of the front and back ends of the cover 100.

Referring to FIGS. 5 and 6, if the cover 100 is made with a top plate 122 and a bottom plate 124 (as opposed to single slab, or a single plate design), the cover 100 will tend to bow up slightly under bright sunlight. The upward bowing may offset sagging. This results because the top plate 122 having direct sun exposure, will be heated more and undergo more thermal expansion, than the bottom plate. While the top plate 122 and the bottom plate 124 will generally be made of the same material, they can also be made of different materials, as desired, to account for thermal expansion or other factors.

Thus, a novel cover assembly has been shown and described. Various changes and substitutions may of course be made, without departing from the spirit and scope of the invention. The invention, therefore, should not be limited, except to the following claims and their equivalents.

The invention claimed is:

1. A cover assembly for a pick-up truck cargo box having first and second box rails, with each box rail having a top surface, comprising:
   first and second side rails attachable to the first and second box rails, respectively;
   a cover supported on the first and second side rails, with the cover including a first panel pivotally attached to a second panel, and a front panel pivotally attached to the second panel;
   with the first and second side rails each having a panel support joined to a clamp plate, with the panel support below the top surface of the first and second box rails, and offset inwardly from, and not overlying, the first and second box rails, respectively, and with one of more of the panels resting on the panel supports;
   a first holding element having a first end attachable to a bottom surface of the front panel, and a second end attachable to the first side rail, adjacent to a front end of the first side rail, for holding the cover in a folded upright position.

2. The cover assembly of claim 1 comprising a second holding element having a first end attachable to a bottom surface of the front panel, and a second end pivotally attachable to the second side rail.

3. The cover assembly of claim 2 further comprising first and second mounting plates on a bottom surface of the front panel, and with the first end of each of the first and second holding elements attachable to the first and second mounting plates, respectively.

4. The cover assembly of claim 2 wherein the holding elements hold the folded cover in an upright and over center position.

5. The cover assembly of claim 1 further comprising a slam latch assembly on a bottom surface of one or more of the panels, with the slam latch assembly including first and second plungers urged outwardly by first and second springs into latching positions wherein the first and second plungers extend at least partially into the first and second side rails, respectively, for latching the panel into engagement with the first and second rails; and
   a release mechanism associated with each slam latch assembly for releasing the first and second plungers from the first and second side rails, respectively.

6. The cover assembly of claim 1 with the panel support substantially perpendicular to the clamp plate.

7. The cover assembly of claim 1 further comprising:
   first and second extension plates at the front end of the first and second side rails, respectively; and
   the front panel attached to the first and second extension plates.

8. The cover assembly of claim 1 further including a first spacer pivotally connecting the second panel to the front panel.

9. The cover assembly of claim 1 wherein the clamp plate extends below the panel support.

10. The cover assembly of claim 1 wherein the clamp plate extends above and below the panel support.

* * * * *